US011209759B2

(12) United States Patent
Odate et al.

(10) Patent No.: US 11,209,759 B2
(45) Date of Patent: Dec. 28, 2021

(54) IMAGE FORMING APPARATUS THAT DISCONNECTS A POWER SUPPLY UPON DETECTING OVERHEATING

(71) Applicant: CANON KABUSHIKI KAISHA, Tokyo (JP)

(72) Inventors: Takashi Odate, Mishima (JP); Nozomu Nakajima, Kawasaki (JP); Junji Suzuki, Shanghai (CN)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/003,070

(22) Filed: Aug. 26, 2020

(65) Prior Publication Data

US 2021/0063923 A1    Mar. 4, 2021

(30) Foreign Application Priority Data

Aug. 28, 2019   (JP) .............................. JP2019-156087

(51) Int. Cl.
*G03G 15/20*    (2006.01)
*G03G 15/00*    (2006.01)

(52) U.S. Cl.
CPC ..... *G03G 15/2039* (2013.01); *G03G 15/2053* (2013.01); *G03G 15/2064* (2013.01); *G03G 15/5004* (2013.01); *G03G 15/80* (2013.01)

(58) Field of Classification Search
USPC .......................................................... 399/69
See application file for complete search history.

(56) References Cited

U.S. PATENT DOCUMENTS

| 2009/0034142 | A1* | 2/2009 | Ushiro | G03G 15/80 361/104 |
| 2011/0299868 | A1* | 12/2011 | Ito | G03G 15/5004 399/69 |
| 2014/0044447 | A1* | 2/2014 | Jeong | G03G 15/80 399/69 |
| 2014/0126922 | A1* | 5/2014 | Imahori | G03G 15/2039 399/33 |
| 2015/0110513 | A1* | 4/2015 | Nagasaki | G03G 15/80 399/70 |

FOREIGN PATENT DOCUMENTS

JP       2007212502 A    8/2007

* cited by examiner

*Primary Examiner* — Q Grainger
(74) *Attorney, Agent, or Firm* — Venable LLP

(57) ABSTRACT

The image forming apparatus including a fixing unit having a heat generation member; a switch unit configured to connect or disconnect a power supply path from an AC power supply to the heat generation member; a temperature detection unit configured to detect a temperature of the heat generation member; a control unit configured to perform operations to supply power to the heat generation member by controlling the switch unit according to a detection result of the temperature detection unit; a setting unit configured to set the switch unit to a state in which the switch unit cuts off the power supply path upon detecting an overheating state of the heat generation member based on a detection result of the temperature detection unit; and a first switch configured to supply or cut off a first driving voltage that drives the setting unit.

10 Claims, 6 Drawing Sheets

IMAGE FORMING APPARATUS THAT DISCONNECTS A POWER SUPPLY UPON DETECTING OVERHEATING

BACKGROUND OF THE INVENTION

Field of the Invention

The present invention relates to an image forming apparatus configured to form an image on a recording material.

Description of the Related Art

As a fixing device in an image forming apparatus, a heating-type fixing device is known that causes an unfixed image formed by an image forming unit of an image forming apparatus which is being borne by a recording material to be fixed thereto by heating the recording material. A heating-type fixing device includes a heat generation member that is a heat source which heats a recording material, an alternating-current power supply configured to supply an electric current to the heat generation member, a temperature detection unit configured to detect the temperature in the vicinity of the heat generation member, and a control unit configured to control the electric current that is supplied to the heat generation member from the alternating-current power supply based on a signal from the temperature detection unit. A fixing device having such a configuration controls the temperature of the heat generation member so as to be a temperature required for fixing an image on a recording material.

In the case of a heating-type fixing device, there is a risk of a failure occurring in the fixing device due to overheating of the heat generation member in a case where the current supply to the heat generation member cannot be controlled due to an unexpected abnormality (for example, at the time of current runaway), and an overheat detection circuit is provided in order to prevent a failure of the fixing device. As disclosed in Japanese Patent Application Laid-Open No. 2007-212502, in a case where an overheating state of a heat generation member is detected by a temperature detection unit such as a thermistor that is arranged in the vicinity of a heat generation member, the current supply to the heat generation member is cut off by a cut-off unit such as a relay that is arranged on the current supply path to the heat generation member. In addition, a configuration is commonly adopted in which a latch circuit is provided that is configured to maintain the cut-off state of the relay, and which sets the relay in a connected state so that the current supply to the heat generation member cannot be resumed unless the power of the image forming apparatus is turned off temporarily and the current supply to the latch circuit is cut off. Further, in order to continue to maintain the cut-off state of the relay, it is necessary for electric current to be continuously supplied to the latch circuit while the power of the image forming apparatus is turned on.

An image forming apparatus operates by switching as required between a print mode that performs image formation on a recording material, a standby mode that is a state in which the apparatus is standing by for input of a print job that requests image formation on a recording material, and a power saving mode for reducing consumption power. The power saving mode is an operation mode that suppresses consumption power by cutting off the power supply to apparatuses related to image formation in the image forming apparatus during a period in which the image forming apparatus is not performing a print operation.

As described above, in an image forming apparatus, an overheat detection circuit and a latch circuit are driven in a case where an overheating state of a heat generation member is detected. However, if the power supply (current supply) to the latch circuit is cut off, the state in which the current supply path to the heat generation member is cut off by a relay circuit will be released. Therefore, in an image forming apparatus, while in the power saving mode also, it is necessary to maintain a supply of current to the latch circuit, and there is thus the problem that even though the image forming apparatus is in the power saving mode, the consumption power at the overheat detection circuit and the latch circuit is high.

SUMMARY OF THE INVENTION

An aspect of the present invention is an image forming apparatus switchable between a first state in which the image forming apparatus performs an image forming operation, and a second state whose consumption power is smaller than consumption power in the first state, the image forming apparatus including a fixing unit having a heat generation member configured to heat a recording material on which image is formed, a switch unit arranged on a power supply path from an AC power supply to the heat generation member, the switch unit configured to connect or disconnect the power supply path, a temperature detection unit configured to detect a temperature of the heat generation member so as to detect an overheating state of the heat generation member, a control unit configured to control the switch unit according to a detection result of the temperature detection unit to supply power to the heat generation member, a setting unit configured to set the switch unit to a state in which the switch unit disconnects the power supply path in a state which the heat generation member is an overheating state, and a first switch configured to switch a turn-on state in which a first driving voltage is supplied to the setting unit or a turn-off state in which a first driving voltage is not supplied to the setting unit, wherein in a case where the image forming apparatus is a second state and the heat generation member is the overheating state of the heat generation member, the first switch switches from the turn-off state to the turn-on state, and the turn-on state is maintained.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

[Configuration of Image Forming Apparatus]

Figure 1:
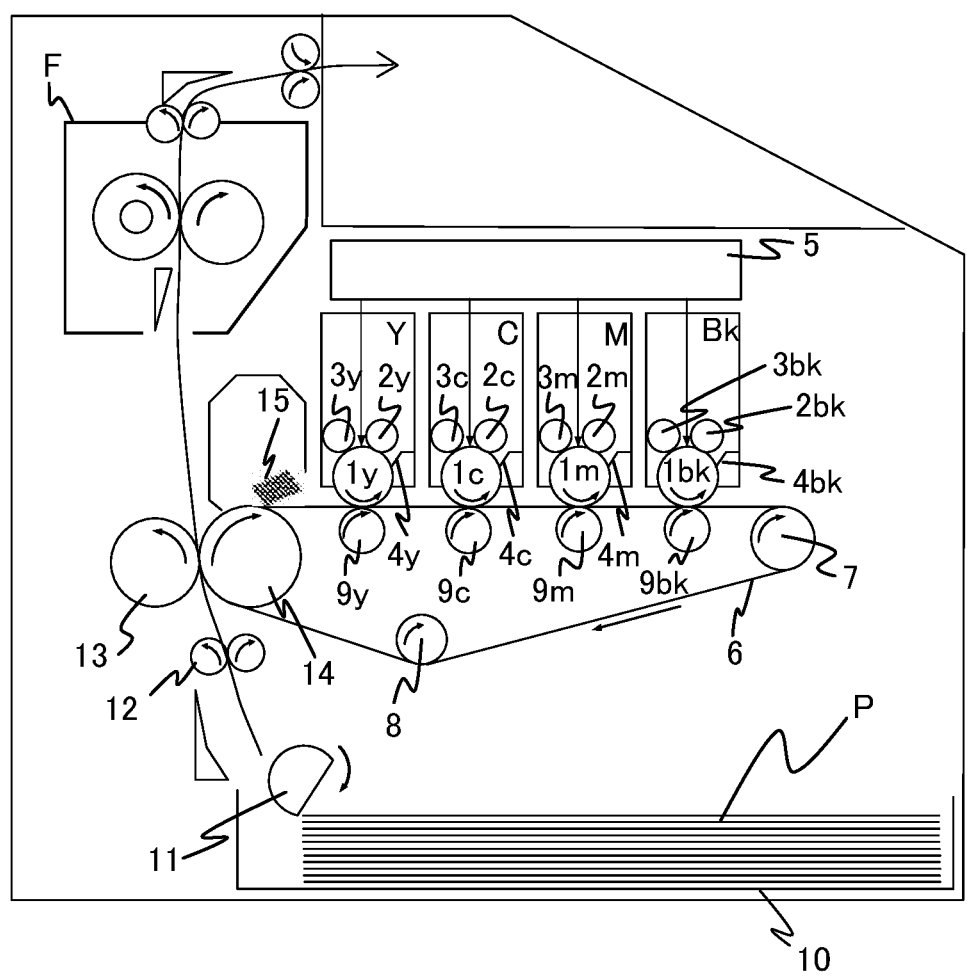
FIG. 1 is a cross-sectional drawing illustrating an outline configuration of an image forming apparatus according to Embodiments 1 to 4.

FIG. 1 is a cross-sectional drawing illustrating an outline configuration of an image forming apparatus of Embodiment 1. The image forming apparatus of the present embodiment is an image forming apparatus that forms a full-color image by superposing toner images of the four colors of yellow, cyan, magenta and black, respectively, using an electrophotographic process. In FIG. 1, reference characters Y, C, M and Bk denote process cartridges that form toner images of the colors yellow, cyan, magenta and black, respectively. Each of the process cartridges Y, C, M and Bk is a so-called "all-in-one cartridge" in which members for image formation which are described hereunder are housed together in a single container (cartridge). The process cartridges Y, C, M and Bk of the respective colors have the same internal configuration, although the color of a toner image formed by each process cartridge differs from that of the other process cartridges. The characters y, c, m and bk added to the end of the reference characters of members constituting the respective process cartridges Y, C, M and Bk represent the color of the toner of the respective process cartridges in which the respective members are included, namely, yellow, cyan, magenta and black. Note that, hereunder, except when indicating a member of a process cartridge of a specific color, the characters y, c, m and bk are omitted from the end of the reference characters of the relevant members.

The process cartridges Y, C, M and Bk of the respective colors each include a photosensitive drum 1 that is an image bearing member, a charge roller 2 that is a charge unit configured to charge the photosensitive drum 1 to a predetermined potential, and a developing unit 3 configured to cause toner to adhere to an electrostatic latent image formed on the photosensitive drum 1 to form a toner image. For example, yellow toner is filled in a developing unit 3y of the process cartridge Y, and cyan toner is filled in a developing unit 3c of the process cartridge C. Further, magenta toner is filled in a developing unit 3m of the process cartridge M, and black toner is filled in a developing unit 3bk of the process cartridge Bk. In addition, the process cartridge of each color has a cleaning unit 4 configured to remove toner that was not transferred onto a primary transfer roller 9, to be described later, and remains on the photosensitive drum 1.

An optical scanning device (also referred to as "optical system") 5 forms an electrostatic latent image on the photosensitive drum 1 by performing exposure that irradiates light according to image data onto the photosensitive drum 1. The optical scanning device 5 has a laser scanning exposure optical system configured to emit a laser beam corresponding to the photosensitive drums 1 of the respective process cartridges Y, C, M and Bk.

When image formation is started, at the respective process cartridges Y, C, M and Bk, after the surface of the photosensitive drum 1 is uniformly charged to a predetermined potential by the charge roller 2, the surface of the photosensitive drum 1 is scanned with a laser beam based on image data by the optical scanning device 5. By this means, an electrostatic latent image corresponding to the image data is formed on the surface of each photosensitive drum 1. Subsequently, a developing voltage that is set to an appropriate voltage value between the charge potential of the charge roller 2 and the latent image (exposed portion) potential of the electrostatic latent image is applied to a developing roller of the developing unit 3 by a high voltage power supply unit (not illustrated). By this means, toner which normally is charged to a negative polarity is electrostatically adsorbed onto the electrostatic latent image formed on the photosensitive drum 1, thereby forming a monochrome toner image on the photosensitive drum 1.

The monochrome toner images formed on the respective photosensitive drums 1 of the respective process cartridges Y, C, M and Bk are successively transferred superposedly onto an intermediate transfer belt 6 that is an intermediate transfer member rotating at a substantially constant speed, in synchrony with rotation of the respective photosensitive drums 1. By this means, a full-color toner image is formed on the intermediate transfer belt 6. In the present embodiment, an endless intermediate transfer belt 6 is used as the intermediate transfer member, and the intermediate transfer belt 6 is wound and stretched around three rollers which are a drive roller 7, a secondary-transfer-roller counter roller 14 and a tension roller 8, and is driven by the drive roller 7.

The primary transfer rollers 9 which are provided facing the respective photosensitive drums 1 are used as transfer units for transferring toner images formed on the respective photosensitive drums 1 of the respective process cartridges Y, C, M and Bk onto the intermediate transfer belt 6. When transferring a toner image from the photosensitive drum 1 onto the intermediate transfer belt 6, a primary transfer voltage of opposite polarity (usually, positive polarity) to the polarity of the toner is applied to the primary transfer roller 9 by the high voltage power supply unit (not illustrated). By this means, a toner image is transferred onto the intermediate transfer belt 6 from the surface of the respective photosensitive drums 1 of the respective process cartridges Y, C, M and Bk. Note that, in each of the process cartridges Y, C, M and Bk, toner that was not transferred to the intermediate transfer belt 6 and remains on the photosensitive drum 1 is removed by the cleaning unit 4. In the present embodiment, the cleaning unit 4 performs cleaning by using a urethane blade to contact the photosensitive drum 1 and remove the residual toner.

On the other hand, a recording material P that is stored in a recording material cassette 10 that is a recording material supplying unit which stores recording material is conveyed to a conveyance path by a feeding roller 11. The recording material P conveyed by the feeding roller 11 is conveyed to a nip portion between the intermediate transfer belt 6 that is wound around the secondary-transfer-roller counter roller 14, and a secondary transfer roller 13 that is a secondary transfer unit at a predetermined control timing by the registration roller 12. Further, the toner images that were transferred onto the intermediate transfer belt 6 are transferred en bloc onto the recording material P by means of a high voltage of opposite polarity to the polarity of the toner that is applied to the secondary transfer roller 13 by the high voltage power supply unit (not illustrated). Note that, after transfer of the toner images to the recording material P, toner remaining on the intermediate transfer belt 6 is removed by an intermediate transfer belt cleaning unit 15. In the present embodiment, similarly to the cleaning unit 4 of the photosensitive drum 1, cleaning of the intermediate transfer belt 6 is performed using a urethane blade.

The toner image that was transferred onto the recording material P is conveyed to a fixing device F that is a fixing unit. At the fixing device F, the unfixed toner image that was transferred to the recording material P is heated and pressurized to thereby fuse the toner and fix the toner image on the recording material P, and the recording material P on which the toner image was fixed is conveyed to a sheet discharge tray through a sheet discharging path.

[Configuration of Fixing Device]

Figure 2:
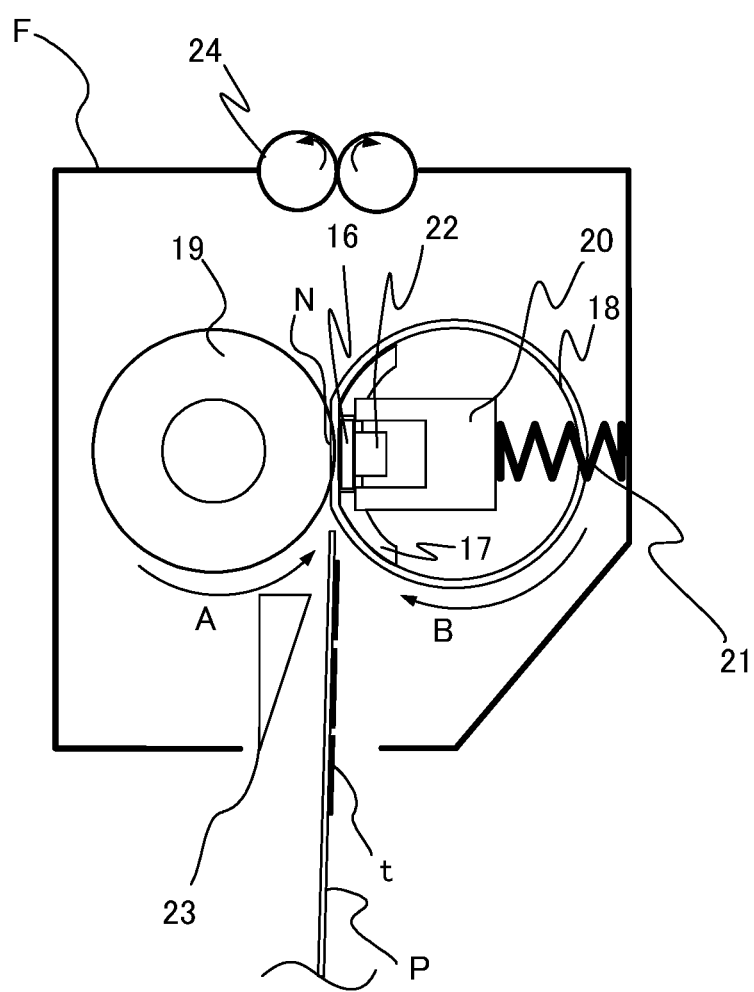
FIG. 2 is a cross-sectional drawing illustrating an outline configuration of a fixing device according to Embodiments 1 to 4.

FIG. 2 is a cross-sectional drawing illustrating an outline configuration of the fixing device F in the present embodiment. The fixing device F of the present embodiment is a fixing device that employs a fixing film method and a pressing rotary member driving method.

In FIG. 2, a fixing heater 16 that is a heat generation member is arranged along the longitudinal direction of a heater holder 17 that is a trough-shaped member having heat resistance and rigidity, and which has a substantially semi-circular arc shape in transverse section. The fixing film 18 is a cylindrical (endless film-like) member prepared by providing an elastic layer on a film-like member, and is loosely fitted to the exterior of the heater holder 17. A pressure roller 19 is arranged in the fixing device F by causing two end portions of a core metal of the pressure roller 19 to be rotatably held via bearings between side plates of an unshown fixing device frame which are on the inner side and the front side in the drawing.

In FIG. 2, on the right side of the pressure roller 19 in the drawing, a heating assembly constituted by the fixing heater 16, the heater holder 17, the fixing film 18 and the like is disposed in parallel with the pressure roller 19, with the fixing heater 16 side facing leftward in the drawing. Further, both end portions of the heater holder 17 are urged by a pressing mechanism constituted by a pressing stay 20 provided inside the heater holder 17, and a pressing spring 21 provided at the both ends in the longitudinal direction of the pressing stay 20. Note that, the pressing mechanism urges the pressure roller 19 in the axial direction with a force of a total pressure of 196 N (20 kgf) which is a force of 98 N (10 kgf) per side. As a result, a surface that faces in the left direction in the drawing of the fixing heater 16 contacts with a predetermined pressing force against the elastic layer of the pressure roller 19 through the fixing film 18, and a fixing nip portion N having a predetermined width sufficient for heat fixing is formed.

The pressure roller 19 is rotationally driven at a predetermined peripheral speed in the counter-clockwise direction indicated by an arrow A in the drawing by a drive unit (not illustrated). As a result of the rotational driving of the pressure roller 19, rotary force acts on the cylindrical fixing film 18 due to a contact frictional force at the fixing nip portion N between the external surface of the pressure roller 19 and the fixing film 18. As a result, the fixing film 18 enters a state in which the fixing film 18 is driven to rotate in the clockwise direction indicated by an arrow B in the drawing along the circumference of the heater holder 17 while the inner surface side of the fixing film 18 slides in a state of being in close contact with the leftward facing surface of the fixing heater 16 in the drawing. Grease (not illustrated) is applied to the inner surface of the fixing film 18, and a sliding property between the heater holder 17 and the inner surface of the fixing film 18 is secured by the grease.

When the pressure roller 19 is rotationally driven and the cylindrical fixing film 18 is brought into a state of being driven to rotate in association with the rotation, a current flows to the fixing heater 16 and as a result the temperature of the fixing heater 16 increases and rises to a predetermined temperature and is subjected to temperature control. Further, a thermistor 22 that is a temperature detection unit for detecting the temperature of the fixing heater 16 is disposed at a central part on the fixing heater 16 that is the heat source through an insulator having a withstand voltage so that an insulation distance can be secured with respect to the heat generation member on the fixing heater 16. In a state in which the fixing heater 16 is controlled to a predetermined temperature in this manner, the recording material P bearing an unfixed toner image t is guided along an entrance guide 23 and introduced between the fixing film 18 and the pressure roller 19 constituting the fixing nip portion N. At the fixing nip portion N, the toner image bearing surface side of the recording material P closely contacts the outer surface of the fixing film 18 and is nipped and conveyed together with the fixing film 18 through the fixing nip portion N. During the course of being nipped and conveyed through the fixing nip portion N, heat of the fixing heater 16 is imparted to the recording material P through the fixing film 18, and the unfixed toner image t on the recording material P is heated and pressed, and is melted and fixed on the recording material P. Subsequently, the recording material P that passed through the fixing nip portion N is self-stripped from the fixing film 18, and discharged to the sheet discharge tray by a fixing discharge roller 24.

[Control of Power Supply to Fixing Heater]

Figure 3:
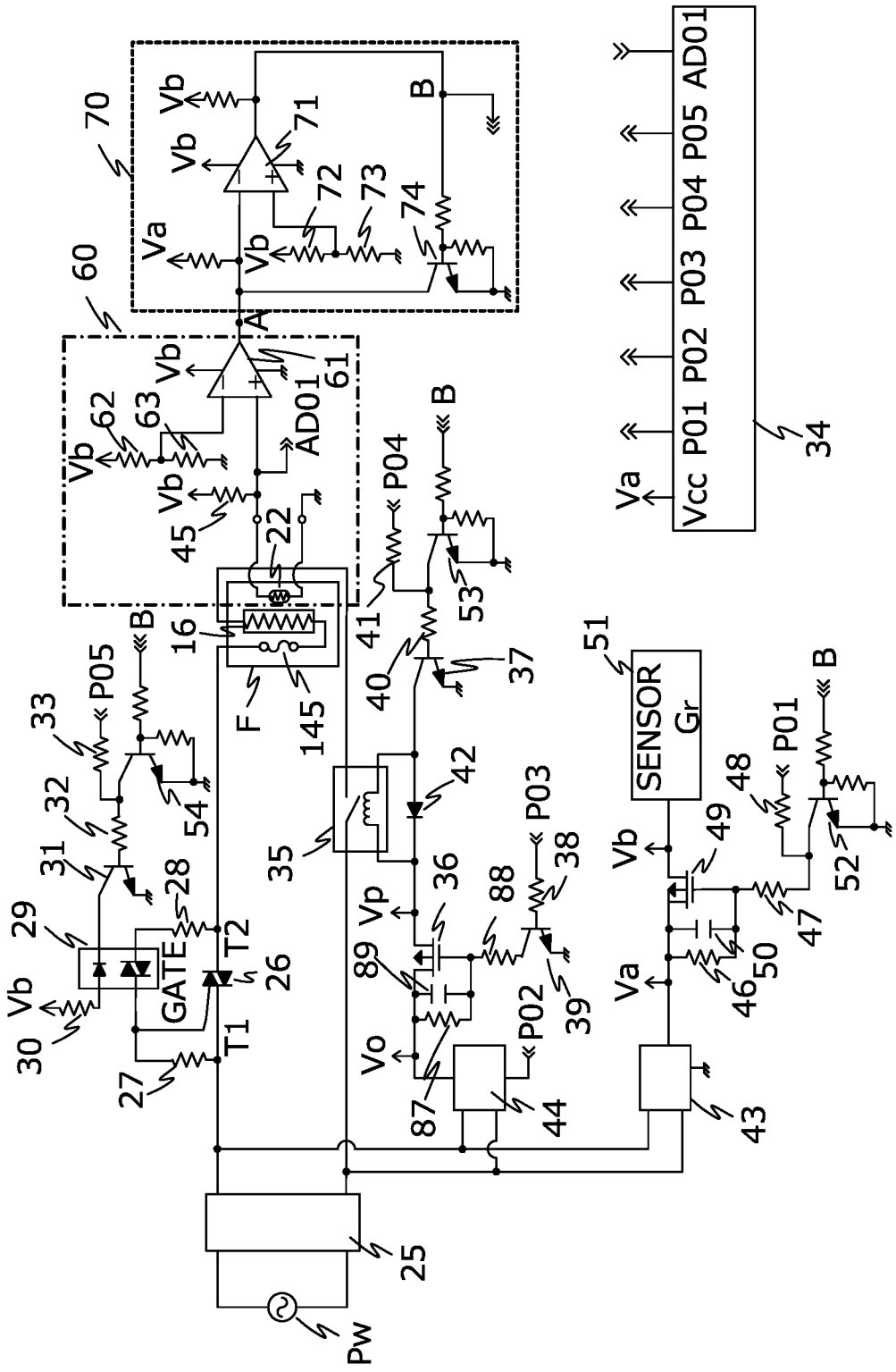
FIG. 3 is a view illustrating circuitry for performing control and monitoring of a fixing device of Embodiment 1.

Next, the control of the power supply to the fixing heater 16 in the present embodiment is described using FIG. 3. FIG. 3 is a view illustrating a circuit configuration for performing control and monitoring of the fixing device F of the present embodiment. In the circuit configuration illustrated in FIG. 3, an alternating-current power supply (AC power supply) Pw is an alternating-current power supply that supplies power to the image forming apparatus of the present embodiment, and the power from the alternating-current power supply Pw is supplied through an AC filter 25 to the fixing heater 16 of the fixing device F.

A bidirectional thyristor (hereinafter, referred to as "triac") 26 (switch unit) and a relay 35 for controlling the power supply to the fixing heater 16 are disposed on the power supply path between the alternating-current power supply Pw and the fixing heater 16. The triac 26 is connected via a temperature protection device 145, described later, to one end of the fixing heater 16, and the relay 35 is connected to the other end of the fixing heater 16. Supply of power to the fixing heater 16 or cutting off of the supply of power to the fixing heater 16 is performed by connecting or cutting off the power supply path by means of the triac 26 and the relay 35.

A photo-triac coupler 29 is an element that supplies a gate voltage for turn on a T1 terminal and a T2 terminal of the triac 26 to be conductive. When a light emitting diode inside the photo-triac coupler 29 enters a conductive state and emits light, a photo-triac inside the photo-triac coupler 29 enters a conductive state. As a result, a voltage that was divided by a resistance 27 and a resistance 28 is applied to the gate of the triac 26, and a gate current flows and the T1 terminal and a T2 terminal of the triac 26 enter a conductive state. Note that, a resistance 30 that is connected to the anode terminal of the light emitting diode of the photo-triac coupler 29 is a limiting resistance for limiting the current of the light emitting diode.

In a transistor 31, the collector terminal is connected to the cathode terminal of the light emitting diode of the photo-triac coupler 29, and the emitter terminal is connected to ground (is grounded). The base terminal of the transistor 31 is connected to a terminal P05 that is an input/output terminal (I/O terminal) of an engine control unit (hereinafter, referred to as "CPU") 34 as a control unit through resistances 32 and 33. According to a signal that is output from the terminal P05 of the CPU 34, the transistor 31 is turned on or off, and the light emitting diode of the photo-triac coupler 29 is set to a conductive state or a non-conductive state.

Further, as described above, the power supply from the alternating-current power supply Pw to the fixing heater 16 can be controlled by the relay 35, and connection or disconnection of the relay 35 is performed by a field effect transistor (hereinafter, referred to as "FET") 36 and a transistor 37. A turn-on state or a turn-off state of the FET 36 is controlled by a turn-on state or a turn-off state of a transistor 39, and the turn-on state or a turn-off state of the transistor 39 is controlled according to a signal from a terminal P03 that is an I/O terminal of the CPU 34 which is input to the base terminal through a resistance 38. In this case, a diode 42 that is connected in parallel to the relay 35 is provided in order to absorb a surge voltage that is generated when the relay 35 is off.

[Circuit Configuration of Fixing Device]

In the fixing device F, in order to detect the temperature of the fixing heater 16, a voltage obtained when a power supply voltage Vb, described later, is divided by a resistance 45 and the thermistor 22 is input as a temperature detection signal (hereinafter, referred to as "TH signal") to a terminal AD01 that is an A/D input port of the CPU 34. The CPU 34 converts an analog signal that is input as the TH signal to a digital signal, and compares the acquired temperature of the fixing heater 16 with a target temperature. The CPU 34 then calculates the power that should be supplied to the fixing heater 16, converts the calculated power to a phase angle (phase control) or a wave number (wave number control) corresponding to the calculated power, and outputs a signal according to the control condition to the transistor 31 via the terminal P05.

The temperature protection device 145 is also arranged in the fixing heater 16 to prevent an abnormal overheating state of the fixing heater 16 that is caused by the power supply from the alternating-current power supply Pw due to a failure of the triac 26 or runaway of the CPU 34 or the like. In this case, for example, a temperature fuse or a thermostatic switch is used as the temperature protection device 145. If the fixing heater 16 enters an abnormal overheating state due to failure of the triac 26 or the like, and the temperature protection device 145 becomes a predetermined temperature or higher, in a case where the temperature protection device 145 is a temperature fuse, the temperature fuse interrupts the power supply, and in a case where the temperature protection device 145 is a thermostatic switch, the thermostatic switch enters a cut-off state. By this means, the power supply from the alternating-current power supply Pw to the fixing heater 16 is cut off.

[Power Supply Voltage of Image Forming Apparatus]

In the present embodiment, the AC voltage supplied from the alternating-current power supply Pw is input to AC/DC converters 43 and 44. As illustrated in FIG. 3, in the image forming apparatus of the present embodiment, four kinds of power supply voltages are used, namely, power supply voltages Va, Vb, Vo and Vp.

(1) Power Supply Voltage Va

The power supply voltage Va is a DC voltage generated by the AC/DC converter 43, and in the present embodiment DC 3.3 V is output. The power supply voltage Va is generated and output by the AC/DC converter 43 when a power supply inlet (not illustrated) of the image forming apparatus is connected to the alternating-current power supply Pw. The power supply voltage Va is input to a Vcc terminal of the CPU 34 that controls the entire image forming apparatus, and drives the CPU 34.

(2) Power Supply Voltage Vb (First Driving Voltage)

The power supply voltage Vb is a power supply voltage for which the output state can be switched by control of the CPU 34. In a case where the CPU 34 set the output of a terminal P01 to Low level, a current from the power supply voltage Va flows to the terminal P01 through resistances 46, 47 and 48, and a voltage obtained when the power supply voltage Va is divided by the resistances 46, 47 and 48 is applied to the gate terminal of an FET 49 (first switch). By this means, the voltage at the gate terminal of the FET 49 drops and the FET 49 enters a turn-on state. When the FET 49 enters a turn-on state, the power supply voltage Va is output from the source terminal to the drain terminal, and the same voltage (3.3 V) as the power supply voltage Va is supplied to the power supply voltage Vb. Note that, because the voltage between the source terminal and the gate terminal of the FET 49 drops according to a time constant that is determined by a capacitor 50 and a resistance 46 connected to the gate terminal, abrupt voltage changes are suppressed. On the other hand, in a case where the CPU 34 sets the output of the terminal P01 to High level, because the voltage applied to the gate terminal of the FET 49 is the High level, the FET 49 enters a turn-off state. As a result, the power supply voltage Va is not output to the drain terminal of the FET 49, and hence the power supply voltage Vb is not output (a turn-off state is entered). Note that, in FIG. 3, because the power supply voltage Vb is supplied to the respective circuit elements, when the output state of the power supply voltage Vb is set to the turn-off state, the load of the AC/DC converter 43 is reduced and the consumption power of the AC/DC converter 43 can be suppressed.

In the present embodiment, the power supply voltage Vb is supplied to an overheat detection circuit 60 of the fixing device F that is surrounded by an alternate long and short dash line in FIG. 3, a latch circuit 70 that is surrounded by a dotted line, a sensor group 51 and the photo-triac coupler 29 and the like. The details of the overheat detection circuit 60 and the latch circuit 70 will be described later. The sensor group 51 is a group of various sensor components provided in the image forming apparatus of the present embodiment. Setting of the output state or turn-off state of the power supply voltage Vb is performed according to operation modes of the image forming apparatus that are described later.

(3) Power Supply Voltage Vo

The power supply voltage Vo is a DC voltage generated by the AC/DC converter 44, and is a power supply voltage which can be set to an output state (turn-on state) or turn-off state according to a signal that is output from a terminal P02 that is an I/O terminal of the CPU 34. In the present embodiment, DC 24 V is output as the power supply voltage Vo. When the output of the power supply voltage Vo is set to the turn-off state, the load of the AC/DC converter 44 decreases and the consumption power of the AC/DC converter 44 can be suppressed. In the present embodiment, the power supply voltage Vo is supplied to a driving apparatus (not illustrated) such as a motor inside the image forming apparatus. Note that, setting of the output state of the power supply voltage Vo is performed according to a power supply operation mode of the main body of the image forming apparatus that is described later.

(4) Power Supply Voltage Vp

The power supply voltage Vp is a power supply voltage that is supplied to the relay 35, and is a power supply voltage for which the output state can be switched by control of the CPU 34. In a case where the CPU 34 sets the output of the terminal P03 that is an I/O terminal to High level, a High level voltage is input to the base terminal of the transistor 39 through the resistance 38 that is connected to the base terminal, and the transistor 39 switches on. When the transistor 39 switches on, because the voltage applied to the gate terminal of the FET 36 decreases to a voltage obtained when the power supply voltage Vo is divided by resistances 87 and 88, the FET 36 enters a turn-on state. When the FET 36 enters a turn-on state, the power supply voltage Vo input from the source terminal is output to the drain terminal, and the same voltage (24 V) as the power supply voltage Vo is supplied as the power supply voltage Vp. Note that, because the voltage between the source terminal and the gate terminal of the FET 36 drops according to a time constant that is determined by a capacitor 89 and the resistance 87 connected to the gate terminal, abrupt voltage changes are suppressed.

[Operation Modes of Image Forming Apparatus]

Next, operating states (hereinafter, referred to as "modes") of the image forming apparatus will be described using Table 1. As the operating states of the image forming apparatus, the image forming apparatus can be switched to either of a normal state in which image formation is possible and a power saving state in which image formation is not performed and consumption power is reduced. As described above, the power supply voltage Va is a voltage whose output state cannot be switched by control of the CPU 34, and a voltage of DC 3.3 V is always output irrespective of the operation mode of the image forming apparatus. On the other hand, with regard to the power supply voltages Vb, Vo and Vp, the output state of each of these power supply voltages can be switched by the CPU 34 according to the operation mode of the image forming apparatus. Further, with regard to the power supply voltage Vb, the output state is switched by operations of the overheat detection circuit 60 that is described later Table 1 shown hereunder is a table in which the kinds of power supply voltages (Va, Vb, Vo, Vp) and the output states of the power supply voltages in switchable operation modes (power saving mode, print/standby mode) of the image forming apparatus are associated.

TABLE 1

| Power Supply | | Output Voltage | |
| --- | --- | --- | --- |
| | | Power saving mode | Print/standby mode |
| Va | | 3.3 V | 3.3 V |
| Vb | (A) When overheat detection circuit is not operating | Off | 3.3 V |
| | (B) When overheat detection circuit is operating | 3.3 V | 3.3 V |
| Vo | | Off | 24 V |
| Vp | | Off | 24 V |

<Operation Mode 1: Power Saving Mode>

The power saving mode is an operation mode that is set in a case where the image forming apparatus does not perform a print operation, and the consumption power of the image forming apparatus is suppressed to the lowest state. As illustrated in Table 1, in the power saving mode, the state is one in which only the power supply voltage Va (3.3 V) is being output, and the power supply voltages Vb, Vo and Vp are in a turn-off state and the power supply voltages are not being output. Therefore, the CPU 34 to which the power supply voltage Va is supplied is in an operating state. Further, in a case (A) when the overheat detection circuit 60 is not operating, the power supply voltage Vb is not output and is in a turn-off state. On the other hand, in a case (B) when the overheat detection circuit 60 is operating, the aforementioned FET 49 maintains a turn-on state, and the power supply voltage Vb is output as a voltage of 3.3 V that is the same voltage as the power supply voltage Va.

<Operation Mode 2: Print/Standby Mode>

The print/standby mode is an operation mode that is set in a standby state in which the image forming apparatus is standing by for a print operation, or in a case where a print operation is performed. As illustrated in Table 1, in the print/standby mode, the state is one in which the power supply voltages Va and Vb that are 3.3 V and the power supply voltages Vo and Vp that are 24 V are output together, and power is supplied to all the circuits of the image forming apparatus.

Thus, in the image forming apparatus of the present embodiment, setting of the power supply voltages to be output is switched according to the operating state, and the power supply to circuits that are not used in the respective operation modes is cut off. By this means, the consumption power of the image forming apparatus can be suppressed.

[Operations of Overheat Detection Circuit and Latch Circuit]

Next, operations of the overheat detection circuit 60 and the latch circuit 70 (setting unit) are described using FIG. 3. According to a detection result of the thermistor 22, the overheat detection circuit 60 illustrated in FIG. 3 actuates the latch circuit 70 and sets the state of the relay 35 provided on the power supply path to the fixing heater 16 to a cut-off state. The TH signal of the thermistor 22 is output to the terminal AD01 of the CPU 34 in order to control the fixing heater 16, and is also input to a non-inverting input terminal (+) of a comparator 61. Further, a voltage obtained when the power supply voltage Vb is divided by resistances 62 and 63 is input as a reference voltage Vref1 to an inverting input terminal (−) of the comparator 61. In this case, a thermistor having a characteristic that the resistance value decreases as the temperature of the fixing heater 16 rises is used as the thermistor 22. Therefore, upon the temperature of the fixing heater 16 rising due to some kind of abnormality, the voltage of the TH signal that was divided by the resistance 45 and the thermistor 22 decreases. Further, if the voltage of the TH signal decreases to less than the reference voltage Vref1, an A-point voltage that is the output voltage of the output terminal of the comparator 61 changes from High level to Low level. In this case, the reference voltage Vref1 is set to the voltage level of the TH signal when the temperature of the fixing heater 16 is 240° C.

The latch circuit 70 is a circuit that has a function which maintains the state of the A-point voltage when the A-point voltage becomes Low level. In the latch circuit 70, the A-point voltage is input to an inverting input terminal (−) of a comparator 71, and a voltage obtained when the power supply voltage Vb is divided by resistances 72 and 73 is input as a reference voltage Vref2 to a non-inverting input terminal (+) of the comparator 71. When the A-point voltage is Low level, because the A-point voltage is lower than the reference voltage Vref2, a B-point voltage that is the output voltage of an output terminal of the comparator 71 changes from the Low level to the High level. The B-point voltage is input to the base terminal of a transistor 74 through a resistance. Because the B-point voltage is the High level, the transistor 74 switches on and maintains the A-point voltage at Low level. Note that, once the transistor 74 enters a turn-on state, regardless of the state of the TH signal, the A-point voltage maintains the Low level state and the B-point voltage continues to maintain the High level state.

If the overheat detection circuit 60 detects an overheating state of the fixing heater 16 and the B-point voltage that is the output voltage of the latch circuit 70 becomes High level, a voltage of High level is applied to the base terminal of a transistor 52 through a resistance connected to the base terminal. By this means, when the transistor 52 switches on, a current flows to the collector terminal of the transistor 52 through the resistances 46 and 47. As a result, a voltage obtained when the power supply voltage Va is divided by the resistances 46 and 47 is applied to the gate terminal of the FET 49, and consequently the voltage of the gate terminal of the FET 49 drops and the FET 49 enters a turn-on state. Further, when the transistor 52 switches on, even if the CPU 34 sets the output of the terminal P01 to High level in order to switch the operation mode of the image forming apparatus to the power saving mode, the turn-on state of the FET 49 is maintained. As a result, the power supply voltage Vb that is the driving voltage that drives the overheat detection circuit 60 and the latch circuit 70 is not switched off (output of the power supply voltage Vb is not stopped). Note that, the turn-on state of the FET 49 is maintained until the voltage input from the alternating-current power supply Pw to the image forming apparatus is cut off and supply of the power supply voltage Va by the AC/DC converter 43 is switched off due to a charging inlet (not illustrated in the drawings) of the image forming apparatus being detached (taken out) from the alternating-current power supply Pw or the like.

Further, in the present embodiment, when the B-point voltage that is the output voltage of the latch circuit 70 becomes High level, a voltage of High level is applied to the base terminal of a transistor 53 through a resistance connected to the base terminal. As a result, when the transistor 53 switches on, even if the CPU 34 sets the output of a terminal P04 to High level, the state remains one in which a voltage of Low level is applied to the base terminal of the transistor 37, and the transistor 37 cannot be switched on. Accordingly, while the B-point voltage maintains a High level, the relay 35 cannot switch on.

Similarly, in the present embodiment, when the B-point voltage that is the output voltage of the latch circuit 70 becomes High level, a High level voltage is applied to the base terminal of a transistor 54 through a resistance connected to the base terminal. When the transistor 54 switches on as a result, even if the CPU 34 sets the output of the terminal P05 to High level and attempts to connect the triac 26, because the state is one in which a Low level voltage is applied to the base terminal of the transistor 31, the transistor 31 cannot be switched on. Accordingly, while the B-point voltage is maintained at the High level, the photo-triac coupler 29 and the triac 26 cannot switch on.

As described above, in a case where the fixing heater 16 is overheated, and the overheat detection circuit 60 detects the overheating state of the fixing heater 16 and the B-point voltage that is the output of the latch circuit 70 becomes High level, the relay 35 and the triac 26 are set in a turn-off state, and the turn-off state is maintained. Thus, in the present embodiment, the power supply path to the fixing heater 16 from the alternating-current power supply Pw can be cut off at two places, and the stability of the overall image forming apparatus can be improved.

As described above, in a case where the fixing heater 16 is not in an overheating state and the overheat detection circuit 60 and the latch circuit 70 are not operating, upon the operation mode of the image forming apparatus switching to the power saving mode, the power supply voltage Vb is also switched off, in addition to the power supply voltages Vo and Vp. By this means, it is possible to reduce the consumption power in the overheat detection circuit 60 and the latch circuit 70 that are driven by the power supply voltage Vb. On the other hand, in a case where the fixing heater 16 enters an overheating state, and the overheat detection circuit 60 and the latch circuit 70 enter an operating state, even if the operation mode of the image forming apparatus switches to the power saving mode, because the FET 49 is held in a turn-on state, the power supply voltage Vb continues to be output. As a result, even if the CPU 34 outputs a High level signal from the terminal P01 in order to switch the operation mode of the image forming apparatus to the power saving mode, because the power supply voltage Vb continues to be supplied, the latch operation of the latch circuit 70 is not released by the power saving mode. In other words, the configuration is such that the latch state of the latch circuit 70 is not influenced by the setting of the operation mode performed by the CPU 34. Therefore, for example, even in a case where a software runaway event occurs at the CPU 34, the aforementioned overheat detection circuit 60 and latch circuit 70 operate normally, and highly reliable protection with respect to an abnormal supply of power to the fixing heater 16 can be realized.

As described above, according to the present embodiment, in the power saving mode, reduction of the consumption power can be performed according to whether or not the fixing device is in an overheating state.

Embodiment 2

In Embodiment 1, a circuit configuration is adopted in which, upon the overheat detection circuit detecting an overheating state of the fixing heater, supply of a power supply voltage that is necessary for operations of the overheat detection circuit and the latch circuit is continued so that the state of the latch circuit is maintained. In Embodiment 2, a circuit is described in which a configuration that cuts off a power supply voltage that drives a triac circuit and a relay circuit which perform operations to connect or disconnect a power supply path to the fixing heater is added to the configuration of Embodiment 1.

[Control of Power Supply to Fixing Heater]

Figure 4:
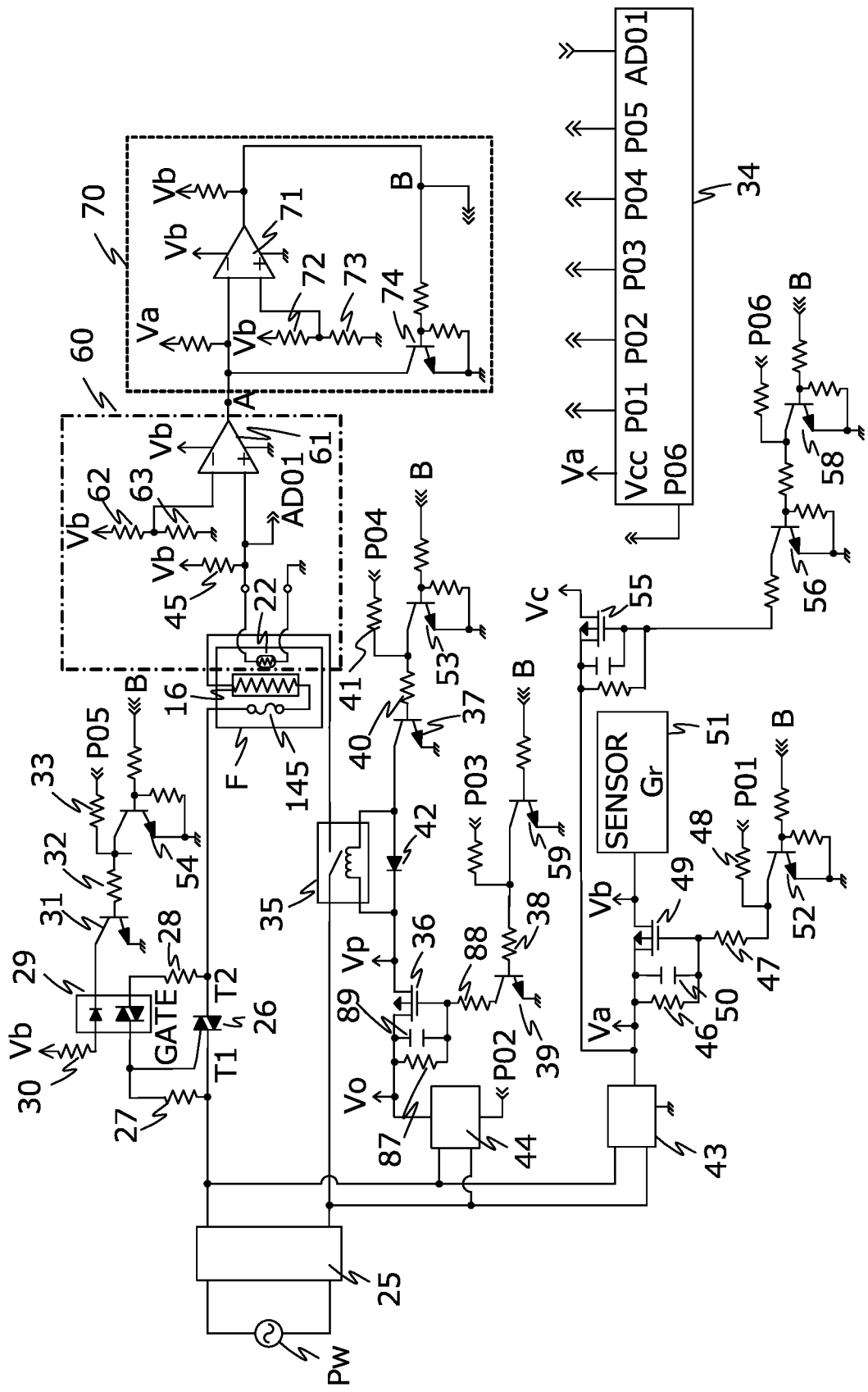
FIG. 4 is a view illustrating circuitry for performing control and monitoring of a fixing device of Embodiment 2.

FIG. 4 is a view illustrating a circuit configuration for performing control and monitoring of the fixing device F of the present embodiment. The circuit configuration illustrated in FIG. 4 of the present embodiment differs from the circuit configuration in FIG. 3 of Embodiment 1 in the respect that a transistor 59 for switching off the power supply voltage Vp that drives the relay 35 is added. In addition, the circuit configuration illustrated in FIG. 4 differs from FIG. 3 in the respect that a circuit that outputs a power supply voltage Vc that drives the light emitting diode inside the photo-triac coupler 29 is added.

The B-point voltage of the latch circuit 70 is input through a resistance to the base terminal of the transistor 59, and the collector terminal of the transistor 59 is connected through the resistance 38 to the base terminal of the transistor 39. Upon the fixing heater 16 entering an overheating state, the B-point voltage of the latch circuit 70 becomes High level, and thus the transistor 59 enters a turn-on state and the transistor 39 enters a turn-off state, and as a result the FET 36 enters a turn-off state and the power supply voltage Vp is set to a turn-off state. By this means, the supply of the power supply voltage Vp that drives the relay 35 is cut off.

Further, a circuit that outputs the power supply voltage Vc from the power supply voltage Va is constituted by an FET 55 and transistors 56 and 58 and the like. In the FET 55 (second switch), the power supply voltage Va is input to the source terminal, and the power supply voltage Vc that is the same voltage as the power supply voltage Va is output from the drain terminal. The collector terminal of the transistor 56 is connected through a resistance to the gate terminal of the FET 55. The emitter terminal of the transistor 56 is connected to ground, and the base terminal is connected through a resistance to a terminal P06 that is an I/O terminal of the CPU 34 and the collector terminal of the transistor 58. The emitter terminal of the transistor 58 is connected to ground, and the B-point voltage of the latch circuit 70 is input through a resistance to the base terminal.

In a case where the CPU 34 sets the output of the terminal P06 to High level in a case where the B-point voltage of the latch circuit 70 is Low level, the transistor 56 switches on, and the FET 55 also switches on because the gate terminal voltage of the FET 55 drops, and the power supply voltage Vc is output. On the other hand, in a case where the B-point voltage of the latch circuit 70 is High level, that is, a case where the fixing heater 16 is in an overheating state, since the transistor 58 enters a turn-on state, the transistor 56 enters a turn-off state and the FET 55 also enters a turn-off state, and therefore the output of the power supply voltage Vc enters a turn-off state. By this means, supply of the power supply voltage Vc that drives the photo-triac coupler 29 is cut off, and the triac 26 enters a turn-off state.

[Configuration of Power Supply of Image Forming Apparatus]

As described above, in the present embodiment the power supply voltage Vc is added as illustrated in FIG. 4, in addition to the power supply voltages of Embodiment 1

(5) Power Supply Voltage Vc (Second Driving Voltage)

The power supply voltage Vc is a power supply voltage that is supplied to the photo-triac coupler 29, and is a power supply voltage for which the output state can be switched by control of the CPU 34. When the output of the terminal P06 of the CPU 34 is set to High level, because the transistor 56 switches on, a voltage that was divided by resistances between the source terminal of the FET 55 and the collector terminal of the transistor 56 is applied to the gate terminal of the FET 55. As a result, the gate voltage of the FET 55 drops, and the FET 55 enters a turn-on state. Upon the FET 55 entering a turn-on state, the power supply voltage Va is output from the source terminal to the drain terminal, and a voltage (3.3 V) that is the same voltage as the power supply voltage Va is supplied for the power supply voltage Vc. On the other hand, in a case where the output of the terminal P06 of the CPU 34 is Low level, because the transistor 56 enters a turn-off state and the FET 55 also enters a turn-off state, the power supply voltage Vc is not output. Further, when the overheat detection circuit 60 operates and the B-point voltage of the latch circuit 70 becomes High level, the transistor 58 enters a turn-on state and the transistor 56 enters a turn-off state, and hence the FET 55 also enters a turn-off state and the power supply voltage Vc is not output. The circuit operations in a case where the fixing heater 16 is in an overheating state and the latch circuit 70 is in a latch state are described later.

[Operation Modes of Image Forming Apparatus]

Next, operation modes of the image forming apparatus are described using Table 2. As described above, the power supply voltage Va is a voltage whose output state cannot be switched by control of the CPU 34, and a voltage of DC 3.3 V is always output irrespective of the operation mode of the image forming apparatus. On the other hand, with regard to the power supply voltages Vb, Vc, Vo and Vp, the output state of each of these power supply voltages can be switched by the CPU 34 according to the operation mode of the image forming apparatus. Further, with regard to the power supply voltages Vb, Vc and Vp, the output state is switched by operations of the overheat detection circuit 60 described later.

Table 2 shown hereunder is a table in which the kinds of power supply voltages (Va, Vb, Vc, Vo, Vp) and the output states of the power supply voltages in the operation modes (power saving mode, print/standby mode) of the image forming apparatus are associated.

TABLE 2

| Power Supply | | Output Voltage | |
|---|---|---|---|
| | | Power saving mode | Print/standby mode |
| Va | | 3.3 V | 3.3 V |
| Vb | (A) When overheat detection circuit is not operating | Off | 3.3 V |
| | (B) When overheat detection circuit is operating | 3.3 V | 3.3 V |
| Vc | (A) When overheat detection circuit is not operating | Off | 3.3 V |
| | (B) When overheat detection circuit is operating | Off | Off |
| Vo | | Off | 24 V |
| Vp | (A) When overheat detection circuit is not operating | Off | 24 V |
| | (B) When overheat detection circuit is operating | Off | Off |

<Operation Mode 1: Power Saving Mode>

The power saving mode is an operation mode that is set in a case where the image forming apparatus does not perform a print operation, and the consumption power of the image forming apparatus is suppressed to the lowest state. As illustrated in Table 2, in the power saving mode, the state is one in which only the power supply voltage Va (3.3 V) is being output, and the power supply voltages Vb, Vc, Vo and Vp are in a turn-off state and these power supply voltages are not being output. Therefore, the CPU 34 to which the power supply voltage Va is supplied is in an operating state. Further, although in a case (A) when the overheat detection circuit 60 is not operating, the power supply voltage Vb is not output and is in a turn-off state, in a case (B) when the overheat detection circuit 60 is operating, the aforementioned FET 49 maintains a turn-on state, and the power supply voltage Vb is output as a voltage of 3.3 V that is the same voltage as the power supply voltage Va. Note that, in the case (A) when the overheat detection circuit is not operating and the case (B) when the overheat detection circuit is operating, the power supply voltages Vc and Vp are in a turn-off state and are not output.

<Operation Mode 2: Print/Standby Mode>

The print/standby mode is an operation mode that is set in a standby state which is a state in which the image forming apparatus is standing by for a print operation, or in a case where a print operation is performed. As illustrated in Table 2, in the print/standby mode, the state is one in which the power supply voltages Va and Vb that are 3.3 V and the power supply voltages Vc, Vo and Vp that are 24 V are in an output state (turn-on state), and power is supplied to all the circuits of the image forming apparatus. Note that, in the case (B) when the overheat detection circuit is operating, the power supply voltages Vc and Vp are not output because the FET 55 and the FET 36 enter a turn-off state, respectively, and the power supply voltages Vc and Vp are in a turn-off state.

[Operations when Fixing Heater is in Overheating State]

The circuit operations in a case where the fixing heater 16 is in an overheating state will now be described using FIG. 4. When the overheat detection circuit 60 detects an overheating state of the fixing heater 16 and the B-point voltage that is the output voltage of the latch circuit 70 becomes High level, the transistor 52 switches on, and the FET 49 enters a turn-on state. When the transistor 52 enters a turn-on state, even if the CPU 34 sets the output of the terminal P01 to High level in order to switch the operation mode of the image forming apparatus to the power saving mode, the turn-on state of the FET 49 is maintained. As a result, the power supply voltage Vb that drives the overheat detection circuit 60 and the latch circuit 70 is not switched off (output of the power supply voltage Vb is not stopped).

Further, when the B-point voltage becomes High level, because a High level voltage is input to the base terminal of the transistor 58, the transistor 58 switches on and the transistor 56 switches off, and consequently the FET 55 also enters a turn-off state. When the transistor 58 switches on, even if the CPU 34 sets the output of the terminal P06 to High level in order to switch the operation mode of the image forming apparatus to the power saving mode, the turn-off state of the FET 55 is maintained. As a result, the power supply voltage Vc that drives the photo-triac coupler 29 is not output, and the turn-off state of the triac 26 is maintained.

In addition, when the B-point voltage becomes High level, a High level voltage is input through a resistance to the base terminal of the transistor 59, and as a result the transistor 59 switches on and the transistor 39 switches off, and hence the FET 36 also enters a turn-off state. When the transistor 59 switches on, even if the CPU 34 sets the output of the terminal P03 to High level in order to switch the operation mode of the image forming apparatus to the power saving mode, the turn-off state of the FET 36 is maintained. Therefore, the power supply voltage Vp that drives the relay 35 is not output, and the turn-off state of the relay 35 is maintained. Note that, the turn-off state of the FETs 55 and 36 is maintained until the voltage input from the alternating-current power supply Pw to the image forming apparatus is cut off and supply of the power supply voltage Va by the AC/DC converter 43 is switched off due to a charging inlet (not illustrated) of the image forming apparatus being taken out from the alternating-current power supply Pw or the like.

As described above, in the present embodiment, a power supply path is provided from the alternating-current power supply Pw to the fixing heater 16, and supply of the power supply voltages Vc and Vp for the triac 26 and the relay 35 that control the power supply to the fixing heater 16 is cut-off when the fixing heater 16 is in an overheating state. By this means, highly reliable protection with respect to an abnormal supply of power to the fixing heater 16 can be realized.

As described above, according to the present embodiment, in the power saving mode, reduction of the consumption power can be performed according to whether or not the fixing device is in an overheating state.

Embodiment 3

In Embodiment 3, a circuit configuration in which the overheat detection circuit operates, and switches the supply source of a power supply voltage that drives the overheat detection circuit and the latch circuit according to whether or not the latch circuit is in a latch state is described.

[Control of Power Supply to Fixing Heater]

Figure 5:
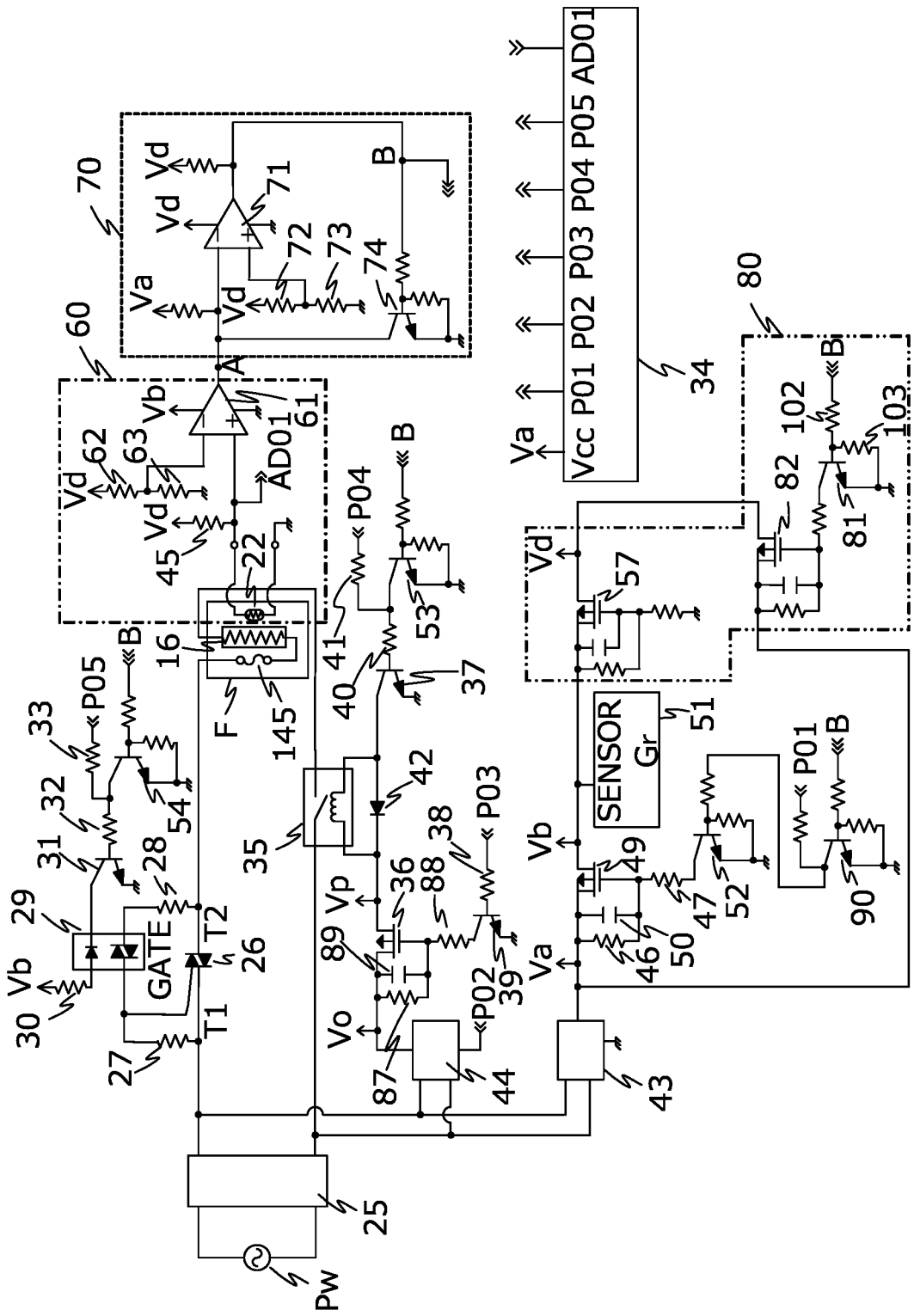
FIG. 5 is a view illustrating circuitry for performing control and monitoring of a fixing device of Embodiment 3.

FIG. 5 is a view illustrating a circuit configuration that performs control and monitoring of the fixing device F of the present embodiment. In FIG. 4 of the present embodiment, the power supply voltage that drives the overheat detection circuit 60 and the latch circuit 70 is a power supply voltage Vd, which is different from Embodiment 1 illustrated in FIG. 3 in which the power supply voltage Vb drives the overheat detection circuit 60 and the latch circuit 70. Further, in FIG. 5, the circuit configuration is one in which the power supply voltage Vd is supplied from the power supply voltage Vb or is supplied from the power supply voltage Va. Therefore, in FIG. 5 of the present embodiment, the circuit configuration differs from the circuit configuration in FIG. 3 of Embodiment 1 in the respect that a power supply switching circuit 80 and a transistor 90 and the like are added in order to switch the power supply voltage that is the source of supply of the power supply voltage Vd. In the present embodiment, in a case where the overheat detection circuit 60 detects an overheating state of the fixing heater 16, and the latch circuit 70 is in a latch state, the power supply voltage Va is supplied for the power supply voltage Vd. On the other hand, in a case where the fixing heater 16 is not in an overheating state, the power supply voltage Vb is supplied for the power supply voltage Vd.

[Configuration of Power Supply of Image Forming Apparatus]

As illustrated in FIG. 5, in the present embodiment, the power supply voltage Vd is added in addition to the power supply voltages of Embodiment 1.

(6) Power Supply Voltage Vd

The power supply voltage Vd is a power supply voltage that is supplied to the overheat detection circuit 60 and the latch circuit 70. In FIG. 5, in a case where the power supply voltage Vb is in a turn-on state, an FET 57 is in a turn-on state, and an FET 82 is in a turn-off state, the same voltage (3.3 V) as the power supply voltage Vb is supplied for the power supply voltage Vd. On the other hand, in a case where the FET 57 is in a turn-off state and the FET 82 is in turn-on state, the same voltage (3.3 V) as the power supply voltage Va is supplied for the power supply voltage Vd. In the present embodiment, the power supply switching circuit 80 that is surrounded by a chain double-dashed line switches the supply source of the power supply voltage of the power supply voltage Vd that drives the overheat detection circuit 60 and the latch circuit 70, according to whether or not the overheat detection circuit 60 detects an overheating state of the fixing heater 16. The operations of the power supply switching circuit 80 are described later.

[Operation Modes of Image Forming Apparatus]

Next, the operation modes of the image forming apparatus are described using Table 3. As described above, the power supply voltage Va is a voltage whose output state cannot be switched by control of the CPU 34, and a voltage of DC 3.3 V is always output irrespective of the operation mode of the image forming apparatus. On the other hand, with regard to the power supply voltages Vb, Vd, Vo and Vp, the output state of each of these power supply voltages can be switched by the CPU 34 according to the operation mode of the image forming apparatus. Further, with regard to the power supply voltages Vb, Vd and Vp, the output state is switched by operations of the overheat detection circuit 60 described later.

Table 3 shown hereunder is a table in which the kinds of power supply voltages (Va, Vb, Vd, Vo, Vp) and the output states of the power supply voltages in the operation modes (power saving mode, print/standby mode) of the image forming apparatus are associated.

TABLE 3

| Power Supply | | Output Voltage | |
|---|---|---|---|
| | | Power saving mode | Print/standby mode |
| Va | | 3.3 V | 3.3 V |
| Vb | (A) When overheat detection circuit is not operating | Off | 3.3 V |
| | (B) When overheat detection circuit is operating | Off | Off |
| Vd | (A) When overheat detection circuit is not operating | Off | 3.3 V |
| | (B) When overheat detection circuit is operating | 3.3 V | 3.3 V |
| Vo | | Off | 24 V |
| Vp | | Off | 24 V |

<Operation Mode 1: Power Saving Mode>

The power saving mode is an operation mode that is set in a case where the image forming apparatus does not perform a print operation, and the consumption power of the image forming apparatus is suppressed to the lowest state. As illustrated in Table 3, in the power saving mode, the state is one in which only the power supply voltage Va (3.3 V) is being output, and the power supply voltages Vb, Vd, Vo and Vp are in a turn-off state and these power supply voltages are not being output. Therefore, the CPU 34 to which the power supply voltage Va is supplied is in an operating state. Further, in a case (A) when the overheat detection circuit 60 is not operating, because the FET 82 of the power supply switching circuit 80 is in a turn-off state and the power supply voltage Vb is in turn-off state, the power supply voltage Vd is not output and is in a turn-off state. On the other hand, in a case (B) when the overheat detection circuit 60 is operating, since the FET 82 of the power supply switching circuit 80 is in a turn-on state, the power supply voltage Vd is supplied from the power supply voltage Va, and outputs a voltage of 3.3 V. In addition, in the case (B) when the overheat detection circuit 60 is operating, because the power supply voltage Vb is in a turn-off state, a voltage from the power supply voltage Vb is not supplied for the power supply voltage Vd. Note that, in the case (A) when the overheat detection circuit is not operating and the case (B) when the overheat detection circuit is operating, the power supply voltage Vb is not output and is in a turn-off state.

<Operation Mode 2: Print/Standby Mode>

The print/standby mode is an operation mode that is set in a standby state which is a state in which the image forming apparatus is standing by for a print operation, or in a case where a print operation is performed. As illustrated in Table 3, in the print/standby mode, the state is one in which the power supply voltages Va, Vb and Vd that are 3.3 V and the power supply voltages Vo and Vp that are 24 V are in an output state (turn-on state), and power is supplied to all the circuits of the image forming apparatus. Further, in the case (A) when the overheat detection circuit 60 is not operating, the same voltage (3.3 V) as the power supply voltage Vb is output for the power supply voltage Vd. On the other hand, in the case (B) when the overheat detection circuit 60 is operating, with respect to the power supply voltage Vd, the FET 49 enters a turn-off state, and the power supply voltage Vb is not output for the power supply voltage Vd. Therefore, the FET 82 of the power supply switching circuit 80 enters a turn-on state, and the power supply voltage Vd is supplied from the power supply voltage Va, and the same voltage (3.3 V) as the power supply voltage Va is output.

[Operations of Power Supply Switching Circuit]

Next, operations of the power supply switching circuit 80 (switching unit) are described using FIG. 5. In FIG. 5, in a case where the fixing heater 16 is not in an overheating state and the overheat detection circuit 60 is not operating, the B-point voltage of the latch circuit 70 is Low level. Therefore, when the B-point voltage is input to the base terminal of a transistor 81 through a resistance 102, the transistor 81 enters a turn-off state, and the FET 82 whose gate terminal is connected to the collector terminal of the transistor 81 also enters a turn-off state.

On the other hand, when the overheat detection circuit 60 detects an overheating state of the fixing heater 16, the latch circuit 70 enters a latch state, and the B-point voltage becomes High level. Therefore, because a High level voltage is then input through the resistance 102 to the base terminal of the transistor 81, the transistor 81 enters a turn-on state, and the voltage of the gate terminal of the FET 82 decreases, and as a result the FET 82 also enters a turn-on state. Therefore, even if the CPU 34 switches the operation mode of the image forming apparatus to the power saving mode, the power supply voltage Va continues to be supplied for the power supply voltage Vd. As a result, the power supply voltage Vd that drives the overheat detection circuit 60 and the latch circuit 70 is not switched off (output of the power supply voltage Vd is not stopped). Further, when the B-point voltage becomes High level, because a High level voltage is input through a resistance to the base terminal of the transistor 90, the transistor 90 enters a turn-on state. Therefore, even if the CPU 34 sets the output of the terminal P01 to High level in order to output the power supply voltage Vb, the transistor 52 remains in a turn-off state. Because the transistor 52 is in a turn-off state, the FET 49 also enters a turn-off state, and since the power supply voltage Vb is not output, the FET 57 of the power supply switching circuit 80 also enters a turn-off state. Accordingly, while the B-point voltage is maintained at the High level, a state is entered in which the power supply voltage Vd is cut off from the power supply voltage Vb. Note that, this state is maintained until input of the AC voltage to the image forming apparatus from the alternating-current power supply is cut off and supply of the power supply voltage Va from the AC/DC converter 43 enters a turn-off state, due to a charging inlet (not illustrated) of the image forming apparatus being detached (taken out) from the alternating-current power supply Pw or the like.

As described above, when the overheat detection circuit 60 detects an overheating state of the fixing heater 16, it is possible to supply the power supply voltage Vd only to a circuit that is necessary for cutting off the power supply to the fixing heater 16. As a result, since no influence is received from circuits or components to which the other power supply voltages Vb, Vo and Vp are supplied, the reliability of the overheat detection circuit 60 and the latch circuit 70 can be increased.

As described above, according to the present embodiment, in the power saving mode, reduction of the consumption power can be performed according to whether or not the fixing device is in an overheating state.

Embodiment 4

In Embodiment 4, a circuit configuration in which a power switch is provided in the circuit configuration illustrated in Embodiment 3, and a latch state of the latch circuit can be released is described.

[Circuit Configuration of Image Forming Apparatus]

Figure 6:
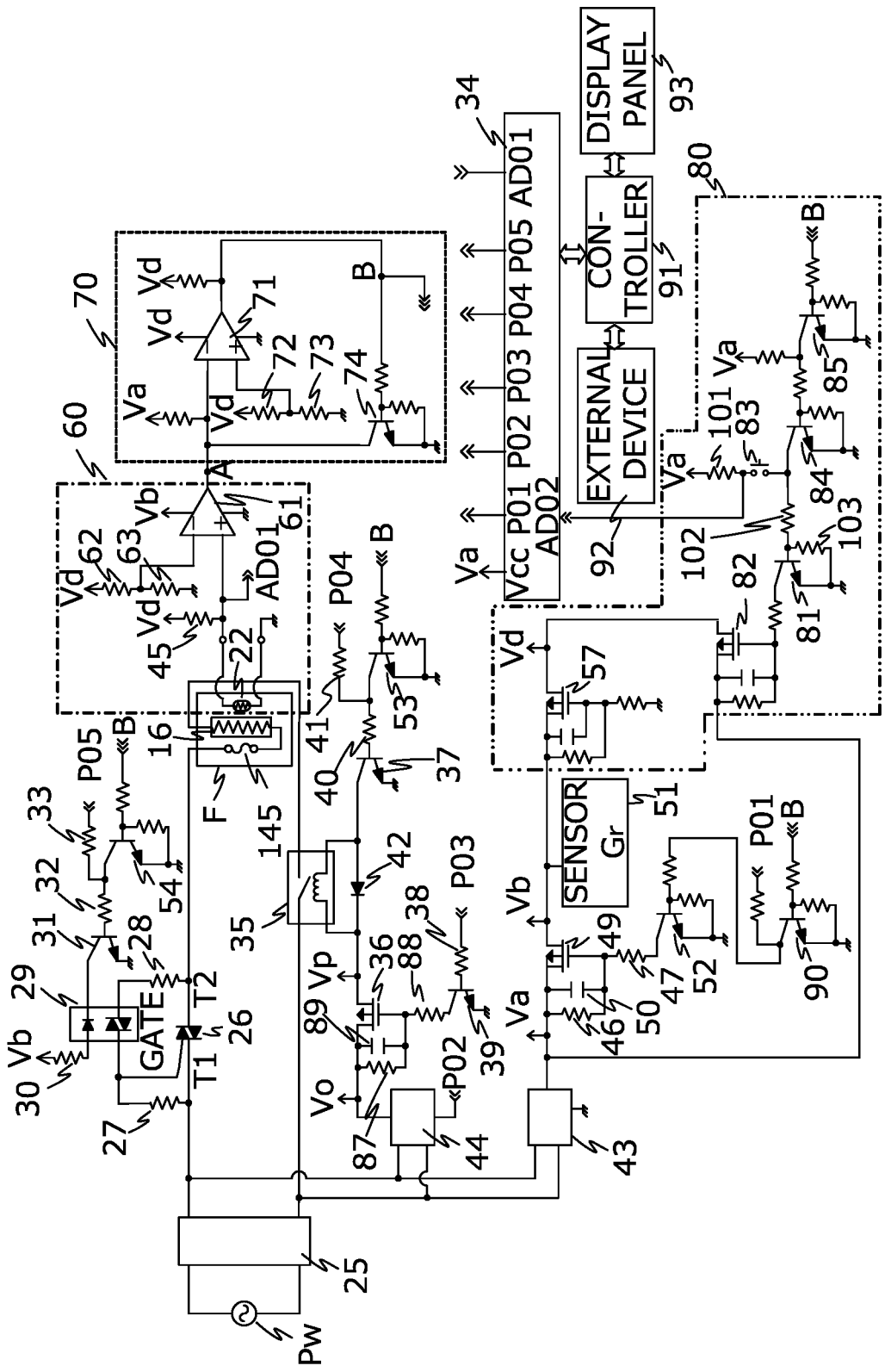
FIG. 6 is a view illustrating circuitry for performing control and monitoring of a fixing device of Embodiment 4.

The circuit configuration of the image forming apparatus of the present embodiment will now be described using FIG. 6. FIG. 6 is a circuit diagram of a configuration in which a power switch 83 for turning the power of the image forming apparatus on and off is added to the circuit for performing control and monitoring of the fixing device F illustrated in FIG. 5 of Embodiment 3, and in which the CPU 34 is capable of detecting the on/off state of the power switch 83. Further, in the present embodiment, a configuration is adopted in which the CPU 34 is capable of detecting the operating state of the overheat detection circuit 60 and the latch circuit 70.

The power switch 83 is a latch-type switch, and when the power switch 83 is switched on or off, a voltage that is input to a terminal AD02 that is an I/O terminal of the CPU 34 changes. By this means, the CPU 34 can detect whether or not the power switch 83 is switched on. In a case where the power switch 83 is in a turn-off state, the power supply voltage Va is input to the terminal AD02 of the CPU 34. Further, because the power switch 83 has been switched off, the CPU 34 performs control that sets the output of each I/O terminal (terminals P01 to P05) to Low level so that the power supply voltages other than the power supply voltage Va are in a turn-off state, and the image forming apparatus enters a turn-off state. In a case where the overheat detection circuit 60 is not operating, because the B-point voltage of the latch circuit 70 is Low level, a voltage of Low level is input through a resistance to the base terminal of a transistor 85. Therefore, the transistor 85 enters a turn-off state, and a transistor 84 enters a turn-on state. If the power switch 83 is switched on in this state, a voltage (voltage of Low level) that is lower than the power supply voltage Va is input to the terminal AD02 of the CPU 34. By means of the fact that the input voltage of the terminal AD02 dropped, the CPU 34 detects that the power switch 83 was switched on, and sets the output of each I/O terminal (terminals P01 to P05) to High level so that the respective power supply voltages enter a turn-on state (are output). By this means, the print/standby mode that is an operation mode in which the image forming apparatus can perform printing is set, and warming-up is performed to prepare for printing.

A controller 91 is connected through a general-purpose interface (USB or the like) to an external device 92 such as a personal computer, and develops information of a print job sent from the external device 92 into bit data, and outputs the developed bit data by the translation to the CPU 34. The controller 91 is also connected to a display panel 93 (display unit), and can display information of the image forming apparatus that is output from the CPU 34.

[Operations of Power Supply Switching Circuit]

Next, operations of the power supply switching circuit 80 are described using FIG. 6. In FIG. 6, in a case where the fixing heater 16 is not in an overheating state and the overheat detection circuit 60 is not operating, the B-point voltage of the latch circuit 70 is at Low level. Therefore, when the B-point voltage is input to the base terminal of the transistor 85 through a resistance, the transistor 85 enters a turn-off state. In this state, in a case where the power switch 83 is in a turn-off state, the power supply voltage Va is input to the base terminal of the transistor 84 and the transistor 84 enters a turn-on state. As a result, the input voltage of the base terminal of the transistor 81 becomes Low level, and the transistor 81 enters a turn-off state, and hence the FET 82 also maintains a turn-off state. Further, even when the power switch 83 is switched on, because the transistor 84 remains in the turn-on state, the transistor 81 and the FET 82 both remain in the turn-off state.

Next, if the fixing heater 16 enters an overheating state and the overheat detection circuit 60 operates, the B-point voltage of the latch circuit 70 changes to High level, and as a result of the B-point voltage being input through the resistance to the base terminal of the transistor 85, the transistor 85 enters a turn-on state. Thereupon, because the voltage that is input to the base terminal of the transistor 84 is voltage of Low level, the transistor 84 enters a turn-off state. At this time, since the power switch 83 is on, the power supply voltage Va is input to the base terminal of the transistor 81 through resistances 101 and 102, and the transistor 81 switches on. Because the voltage applied to the gate terminal of the FET 82 drops as a result of the transistor 81 switching on, the FET 82 enters a turn-on state, and the power supply voltage Va is supplied for the power supply voltage Vd. Since the B-point voltage is maintained at High level by the latch circuit 70, even if the CPU 34 switches the operation mode of the image forming apparatus to the power saving mode, the power supply voltage Va continues to be supplied for the power supply voltage Vd. Therefore, the power supply voltage Vd that drives the overheat detection circuit 60 and the latch circuit 70 is not switched off (the supply is not cut off).

At such time, because a voltage (voltage signal) obtained when the power supply voltage Va is divided by the resistances 101, 102 and 103 is input to the terminal AD02 that is an I/O terminal of the CPU 34, the CPU 34 can detect that the overheat detection circuit 60 has operated. In a case where the CPU 34 detected that the overheat detection circuit 60 has operated, the CPU 34 displays a warning message indicating that the fixing heater 16 is in an overheating state on a display panel 93 through the controller 91. Further, similarly to Embodiment 3, during a period in which the overheat detection circuit 60 operates and the latch circuit 70 is maintaining the B-point voltage at High level, the power supply voltage Vb is in a turn-off state. Note that, although in the present embodiment a configuration is adopted in which the CPU 34 is also capable of detecting the operating state of the overheat detection circuit 60 using the terminal AD02 that detects the on/off state of the power switch 83, for example, a method may also be adopted in which the on/off state of the power switch 83 is detected by inputting the B-point voltage into another I/O terminal of the CPU 34.

If the power switch 83 is switched off at a time when the overheat detection circuit 60 is operating and the latch circuit 70 is in a latch state, the power supply voltage Va that was being input to the base terminal of the transistor 81 is cut off, and therefore the transistor 81 enters a turn-off state. As a result, the FET 82 also enters a turn-off state, and because the power supply voltage Vd being supplied in order to drive the overheat detection circuit 60 and the latch circuit 70 enters a turn-off state, the latch state of the latch circuit 70 is released.

As described above, in the present embodiment a configuration is adopted in which a latch state of the latch circuit 70 can be released by performing an off/on operation of the power switch 83. Therefore, even in a case where the overheat detection circuit 60 or the latch circuit 70 malfunctions due to noise or the like, the image forming apparatus can be restored to a normal state by an operation performed by a user. Further, in a case where the overheat detection circuit 60 operates due to overheating of the fixing heater 16, it is possible to prompt the user to perform an off/on operation of the power switch 83 or to request a service person to deal with the situation or the like by displaying a warning message to a user or the like on the display panel.

As described above, according to the present embodiment, in the power saving mode, reduction of consumption power can be performed according to whether or not the fixing device is in an overheating state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-156087, filed Aug. 28, 2019, which is hereby incorporated by reference herein in its entirety.

What is claimed is:

1. An image forming apparatus switchable between a first mode in which the image forming apparatus performs an image forming operation, and a second mode whose consumption power is smaller than consumption power in the first mode, the image forming apparatus comprising:
   a fixing unit having a heat generation member configured to heat a recording material on which an image has been formed;
   a switch unit arranged on a power supply path from an AC power supply to the heat generation member, the switch unit configured to connect or disconnect the power supply path;
   a temperature detection unit configured to detect a temperature of the heat generation member so as to detect an overheating state of the heat generation member;
   a setting unit configured to set the switch unit to a disconnected state in which the power supply path is disconnected in a case where the temperature detection unit detects the overheating state of the heat generation member; and
   a first switch configured to switch between a turn-on state in which a first driving voltage is supplied to the setting unit and a turn-off state in which the first driving voltage is not supplied to the setting unit; and
   a control unit configured to control the first switch so that the first switch is switched to the turn-on state in a case where the image forming apparatus is in the first mode, and the first switch is switched to the turn-off state in a case where the image forming apparatus is in the second mode,
   wherein in a case where the image forming apparatus enters the second mode after the temperature detection unit detects the overheating state of the heat generation member, the setting unit is configured to maintain the turn-on state of the first switch.

2. The image forming apparatus according to claim 1, comprising:
   a second switch configured to switch between a turn-on state in which a second driving voltage is supplied to the switch unit and a turn-off state in which the second driving voltage is not supplied to the switch unit,
   wherein in the case where the heat generation member is in the overheating state, the second switch switches from the turn-on state to the turn-off state, and cuts off the power supply path.

3. The image forming apparatus according to claim 1, comprising:
   a voltage switching unit configured to switch a supply source of the first driving voltage,
   wherein in the case where the heat generation member is not the overheating state, the voltage switching unit supplies a driving voltage to drive the switch unit as the first driving voltage, and in the case where the heat generation member is in the overheating state, the voltage switching unit supplies a driving voltage to drive the control unit as the first driving voltage.

4. The image forming apparatus according to claim 3, wherein supply to the switch unit of the driving voltage to drive the switch unit is cut off in the case where the heat generation member is the overheating state, and in the second mode.

5. The image forming apparatus according to claim 4, comprising:
   a power switch configured to switch a power supply to the image forming apparatus;
   wherein in a case where the power switch is switched off, the power supply to the control unit is cut off.

6. The image forming apparatus according to claim 5, wherein in a case where the power switch is in the turn-on state, the control unit detects whether or not the temperature detection unit detects the overheating state of the heat generation member, based on a voltage signal input from the power switch.

7. The image forming apparatus according to claim 6, comprising:
   a display unit configured to display information;
   wherein in a case where the temperature detection unit detects the overheating state of the heat generation member, the control unit displays the overheating state of the heat generation member on the display unit.

8. The image forming apparatus according to claim 1, wherein the switch unit is a bidirectional thyristor.

9. The image forming apparatus according to claim 1, comprising:
   a relay arranged on a power supply path from the AC power supply to the heat generation member, the relay configured to connect or disconnect the power supply path;
   wherein in the case where the heat generation member is in the overheating state based on a detection result by the temperature detection unit, the setting unit switches the relay to a turn-off state to disconnect the power supply path.

10. The image forming apparatus according to claim 1, comprising the AC power as a power supply for supplying electric power to the image forming apparatus;
    wherein a voltage output from the power supply to the image forming apparatus in the second mode is smaller than a voltage output from the power supply to the image forming apparatus in the first mode.

* * * * *